(12) United States Patent
Yan (10) Patent No.: US 9,942,372 B2
(45) Date of Patent: Apr. 10, 2018

(54) METHOD, DEVICE AND TOUCH SCREEN TERMINAL FOR PROCESSING INCOMING CALLS WHEN DRIVING

(71) Applicant: ZTE Corporation, Shenzhen, Guangdong (CN)

(72) Inventor: Zongjing Yan, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 157 days.

(21) Appl. No.: 14/888,795

(22) PCT Filed: Jul. 22, 2013

(86) PCT No.: PCT/CN2013/079820
§ 371 (c)(1),
(2) Date: Nov. 24, 2015

(87) PCT Pub. No.: WO2013/167067
PCT Pub. Date: Nov. 14, 2013

(65) Prior Publication Data
US 2016/0088140 A1 Mar. 24, 2016

(30) Foreign Application Priority Data
May 3, 2013 (CN) .......................... 2013 1 0162581

(51) Int. Cl.
*H04M 1/00* (2006.01)
*H04B 1/38* (2015.01)
(Continued)

(52) U.S. Cl.
CPC ..... *H04M 1/6075* (2013.01); *H04M 1/72577* (2013.01); *H04M 1/72583* (2013.01); *H04M 1/72597* (2013.01); *H04M 2250/22* (2013.01)

(58) Field of Classification Search
CPC ....... H04W 4/00–4/005; H04W 4/008; H04W 4/12; H04W 4/14; H04W 4/16; H04W 4/20; H04W 68/00–68/12
See application file for complete search history.

(56) References Cited

U.S. PATENT DOCUMENTS 6,026,161 A * 2/2000 Larsen ................ H04M 1/7258
379/433.06
2004/0198332 A1* 10/2004 Lundsgaard ........ H04M 1/6083
455/417
(Continued)

FOREIGN PATENT DOCUMENTS

CN 101588407 A 11/2009
CN 101902515 A 12/2010
(Continued)

OTHER PUBLICATIONS

Supplementary European Search Report in European application No. 13786953.3, dated Jun. 23, 2016.
(Continued)

*Primary Examiner* — San Htun
(74) *Attorney, Agent, or Firm* — Oppedahl Patent Law Firm LLC (57) ABSTRACT

A method and device for processing an incoming call when driving are provided. The method includes that when a touch screen terminal receives an incoming call, a function of normally processing an incoming call and a function of urgently processing an incoming call are activated; an incoming call response which is made by a user through the function of normally processing an incoming call or the function of urgently processing an incoming call is detected; and the incoming call is processed correspondingly according to a result of the detected incoming call response. Thus, it is more convenient for a user who receives an incoming call when driving to urgently answer or reject the incoming
(Continued)

call, thereby improving the security of the user processing the incoming call with the touch screen terminal when driving.

3 Claims, 4 Drawing Sheets

(51) Int. Cl.
*H04M 3/00* (2006.01)
*H04M 1/60* (2006.01)
*H04M 1/725* (2006.01)

(56) References Cited

U.S. PATENT DOCUMENTS

| | | | |
|---|---|---|---|
| 2008/0144805 A1* | 6/2008 | Chew | H04M 1/6041 379/387.02 |
| 2009/0221274 A1 | 9/2009 | Venkatakrishnan | |
| 2009/0285383 A1 | 11/2009 | Tsuei | |
| 2011/0151852 A1* | 6/2011 | Olincy | H04M 1/72552 455/418 |
| 2012/0052920 A1 | 3/2012 | Kobayashi | |
| 2012/0071150 A1 | 3/2012 | Gong | |
| 2013/0122965 A1 | 5/2013 | Tsui | |
| 2014/0155039 A1* | 6/2014 | Kim | H04W 4/12 455/412.1 |
| 2015/0271320 A1 | 9/2015 | Kobayashi | |

FOREIGN PATENT DOCUMENTS

| | | |
|---|---|---|
| CN | 102339126 A | 2/2012 |
| EP | 2120436 A1 | 11/2009 |

OTHER PUBLICATIONS

International Search Report in international application No. PCT/CN2013/079820, dated Feb. 20, 2014.
English Translation of the Written Opinion of the International Search Authority in international application No. PCT/CN2013/079820, dated Feb. 20, 2014.

* cited by examiner

METHOD, DEVICE AND TOUCH SCREEN TERMINAL FOR PROCESSING INCOMING CALLS WHEN DRIVING

TECHNICAL FIELD

The disclosure relates to the field of communications, and in particular to a method, device and touch screen terminal for processing an incoming call when driving.

BACKGROUND

With the improvement of people' living standard and the popularization and application of modern communication tools, there are more and more people owning both a mobile phone and a car. A mobile phone brings convenience to a driver's life, but also brings hidden trouble to the security of driving; talking on the mobile phone when driving distracts the driver, and then a traffic accident is very likely to occur in emergency; especially for a touch screen mobile phone with a large screen, it is even very difficult to reject a call. Thus, the Road Traffic Safe Law stipulates explicitly that it is not allowed to make and answer a call with a mobile phone when driving. Although many drivers know the danger of talking on the mobile phone, and they are able not to make a call initiatively when driving, however, having an incoming call when driving is unpredictable, and a calling party does not know that the phone owner is driving; with the design of the existing mobile phone, answering a call will make it dangerous to drive, and not answering the call may delay an important thing, which makes the phone owner face a dilemma. So, it is a problem to be solved about how to improve the security of a driver processing an incoming call when driving.

SUMMARY

In view of this, the embodiments of the disclosure are mainly intended to provide a method, device and touch screen terminal for processing an incoming call when driving, which can solve the problem that it is hard to process an unpredictable incoming call when driving better.

To this end, the technical solutions of the disclosure are implemented as follows.

A method for processing an incoming call when driving is provided, which includes that:
  when a touch screen terminal receives an incoming call, a function of normally processing an incoming call and a function of urgently processing an incoming call are activated;
  an incoming call response which is made by a user through the function of normally processing an incoming call or the function of urgently processing an incoming call is detected; and
  the incoming call is processed correspondingly according to a result of the detected incoming call response.

Preferably, the touch screen terminal may activate the function of urgently processing an incoming call by activating physical buttons on it, wherein the physical buttons include an urgent answering shortcut button for answering the incoming call and an incoming call rejecting shortcut button for rejecting the incoming call.

Preferably, after the touch screen terminal activates the function of normally processing an incoming call and the function of urgently processing an incoming call, the touch screen terminal may start a timer and detect the incoming call response of the user within the timing time of the timer.

Preferably, when the incoming call response which is made by the user by triggering the urgent answering shortcut button is detected within the timing time, then the incoming call is answered.

Preferably, when the incoming call response which is made by the user by triggering the incoming call rejecting shortcut button is detected within the timing time, then the incoming call is rejected, and preset notification information is sent to a calling party.

Preferably, when the incoming call response which is made by the user by triggering a touch area for normally processing the incoming call is detected within the timing time, then the incoming call is answered or rejected according to the triggered touch area.

Preferably, when the incoming call response which is made by the user is not detected within the timing time, then the incoming call is rejected, and the preset notification information is sent to the calling party.

A device for processing an incoming call when driving is also provided, which includes:
  an activating module, which is configured to, when the touch screen terminal receives the incoming call, activate the function of normally processing an incoming call and the function of urgently processing an incoming call;
  a detecting module, which is configured to detect the incoming call response which is made by the user through the function of normally processing an incoming call or the function of urgently processing an incoming call; and
  an incoming call processing module, which is configured to process the incoming call correspondingly according to the result of the detected incoming call response.

Preferably, the activating module may be configured to activate the function of urgently processing an incoming call by activating the physical buttons on the touch screen terminal, wherein the physical buttons include the urgent answering shortcut button for answering the incoming call and the incoming call rejecting shortcut button for rejecting the incoming call.

Preferably, the detecting module may include:
  a timer sub-module, which is configured to, after the touch screen terminal activates the function of normally processing an incoming call and the function of urgently processing an incoming call, start the timer; and
  a detecting sub-module, which is configured to detect the incoming call response of the user within the timing time of the timer.

Preferably, the incoming call processing module may include:
  an incoming call urgent processing sub-module, which is configured to, when the incoming call response which is made by the user by triggering the urgent answering shortcut button is detected within the timing time, answer the incoming call, or, when the incoming call response which is made by the user by triggering the incoming call rejecting shortcut button is detected within the timing time, or the incoming call response which is made by the user is not detected within the timing time, reject the incoming call, and send the preset notification information to the calling party;
  an incoming call normal processing sub-module, which is configured to, when the incoming call response which is made by the user by triggering the touch area for normally processing the incoming call is detected within the timing time, answer or reject the incoming call according to the triggered touch area.

A touch screen terminal for processing an incoming call when driving is also provided, which includes the device for processing an incoming call when driving.

By using the technical solutions of the disclosure, it is more convenient for a user who receives an incoming call when driving to urgently answer or reject the incoming call, thereby improving the security of the user who is processing the incoming call with the touch screen terminal when driving.

DETAILED DESCRIPTION

The preferred embodiments of the disclosure are elaborated below in combination with the accompanying drawings; it should be understood that the preferred embodiments elaborated below are only for elaborating and illustrating the disclosure and are not intended to limit the disclosure.

Figure 1:
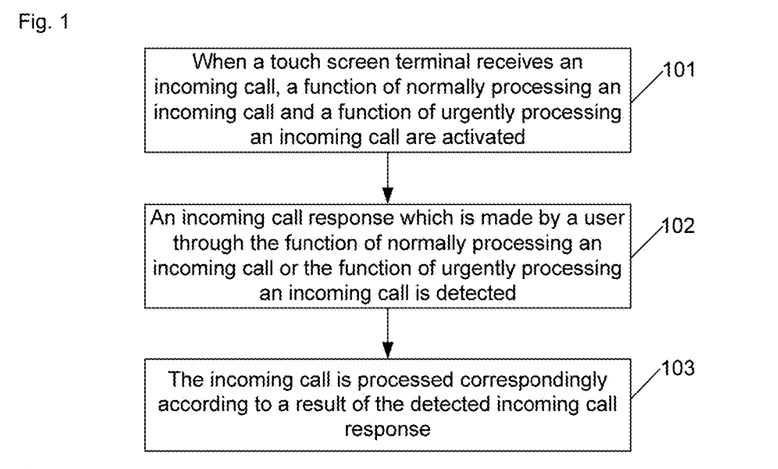
FIG. 1 is a flowchart of a method for processing an incoming call when driving according to an embodiment of the disclosure.

FIG. 1 is a flowchart of a method for processing an incoming call when driving according to an embodiment of the disclosure; as shown in FIG. 1, the method includes the following steps.

Step 101 is that when a touch screen terminal receives an incoming call, a function of normally processing an incoming call and a function of urgently processing an incoming call are activated;

in the Step 101, when the touch screen terminal receives the incoming call, the touch screen terminal activates the function of urgently processing an incoming call by activating the physical buttons on it, wherein the physical buttons include an urgent answering shortcut button for answering the incoming call and an incoming call rejecting shortcut button for rejecting the incoming call. For example, enabling signals are sent to the physical buttons to activate the physical buttons, thereby activating the function of urgently processing an incoming call.

Step 102 is that an incoming call response which is made by a user through the function of normally processing an incoming call or the function of urgently processing an incoming call is detected;

in the Step 102, after the touch screen terminal activates the function of normally processing an incoming call and the function of urgently processing an incoming call, it starts a timer to time, and checks the incoming call response of the user within the timing time of the timer. The timing time can be set according to need, for example, it may be set as 10 s, 15 s, 20 s, and so on.

Step 103 is that the incoming call is processed correspondingly according to a result of the detected incoming call response.

In the Step 103, if the incoming call response which is made by the user by triggering the urgent answering shortcut button is detected within the timing time, then the touch screen terminal answers the incoming call; if the incoming call response which is made by the user by triggering the incoming call rejecting shortcut button is detected within the timing time, then the touch screen terminal rejects the incoming call, and sends preset notification information to a calling party; if the incoming call response which is made by the user by triggering the touch area for normally processing the incoming call is detected within the timing time, for example, sliding in the touch area for answering/rejecting, then the touch screen terminal answers or rejects the incoming call according to the triggered touch area for answering/rejecting; if the incoming call response which is made by the user is not detected within the timing time, then the touch screen terminal rejects the incoming call, and sends the preset notification information to the calling party.

Here, sending the preset notification information to the calling party when rejecting the incoming call can enable the calling party to know a state of a called party, for example, the called party is in a driving state.

Figure 2:
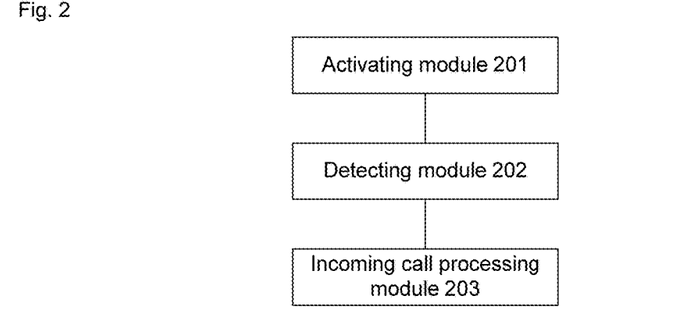
FIG. 2 is a structural diagram of a device for processing an incoming call when driving according to an embodiment of the disclosure.

FIG. 2 is a structural diagram of a device for processing an incoming call when driving according to an embodiment of the disclosure; as shown in FIG. 2, the device includes:

the activating module 201, which is configured to, when the touch screen terminal receives an incoming call, activate a function of normally processing an incoming call and a function of urgently processing an incoming call;

specifically, the activating module 201 activates the function of urgently processing an incoming call by activating the physical buttons on the touch screen terminal, wherein the physical buttons include the urgent answering shortcut button for answering the incoming call and the incoming call rejecting shortcut button for rejecting the incoming call;

for example, the activating module 201 activates the urgent answering shortcut button and the incoming call rejecting shortcut button by sending enabling signals to these buttons, thereby activating the function of urgently processing an incoming call;

the detecting module 202, which is configured to detect the incoming call response which is made by the user through the function of normally processing an incoming call or the function of urgently processing an incoming call;

specifically, the detecting module 202 includes a timer sub-module which is configured to, after the touch screen terminal activates the function of normally processing an incoming call and the function of urgently processing an incoming call, start the timer, and includes a detecting sub-module which is configured to detect the incoming call response of the user within the timing time of the timer; wherein, the timing time can be set according to the need, for example, it may be set as 10 s, 15 s, 20 s, and so on;

the incoming call processing module 203, which is configured to process the incoming call correspondingly according to a result of the detected incoming call response.

Specifically, the incoming call processing module 203 includes an incoming call urgent processing sub-module and an incoming call normal processing sub-module; wherein, the incoming call urgent processing sub-module is configured to, when the incoming call response which is made by the user by triggering the urgent answering shortcut button is detected within the timing time, answer the incoming call, or, when the incoming call response which is made by the user by triggering the incoming call rejecting shortcut button is detected within the timing time, or the incoming call response which is made by the user is not detected within the timing time, reject the incoming call, and send the preset notification information to the calling party;

the incoming call normal processing sub-module is configured to, when the incoming call response which is made by the user by triggering the touch area for normally processing the incoming call is detected within the timing time, answer or reject the incoming call according to the triggered touch area.

Furthermore, the disclosure also provides a touch screen terminal for processing an incoming call when driving, which includes the device for processing an incoming call when driving.

Figure 3:
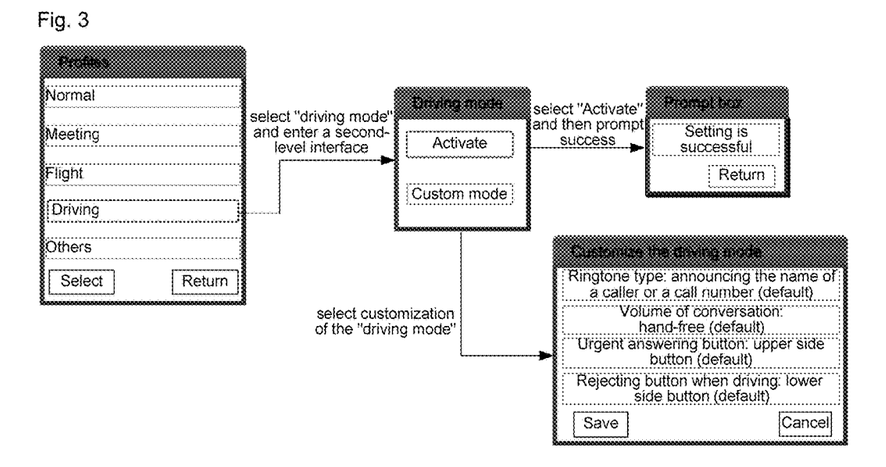
FIG. 3 is a diagram of setting a driving mode according to an embodiment of the disclosure.

FIG. 3 is a diagram of setting a driving mode according to an embodiment of the disclosure.

The embodiment of the disclosure sets a driving mode in the touch screen terminal, and enters a "in a driving mode" under the second-level interface by opening a "profile" under the first-level interface and selecting a "driving mode" under the first-level interface.

In the "in a driving mode" under the second-level interface, a user can enable the "driving mode" by an "activate" option, and can also enable the "driving mode" after making custom settings to the "driving mode".

Specifically, the custom settings to the "driving mode" mainly include the following contents:

1. a ringtone mode of call reminder, recommending announcement of the name of the caller and/or the call number;
2. the volume of conversation, recommending hand-free;
3. the urgent answering shortcut button, recommending upper side button; and
4. the incoming call rejecting shortcut button, recommending lower side button.

Furthermore, two physical shortcut buttons are added in the "driving mode" based on a "normal mode", which are respectively the urgent answering shortcut button for urgently answering an incoming call and the incoming call rejecting shortcut button for rejecting the incoming call fast.

In this way, in the "driving mode", the user who receives the incoming call when driving can answer or reject the incoming call faster and more efficiently because the touch screen terminal is in a state which enables answering or rejecting of the incoming call most conveniently.

The touch screen terminal can be a touch screen mobile phone.

Figure 4:
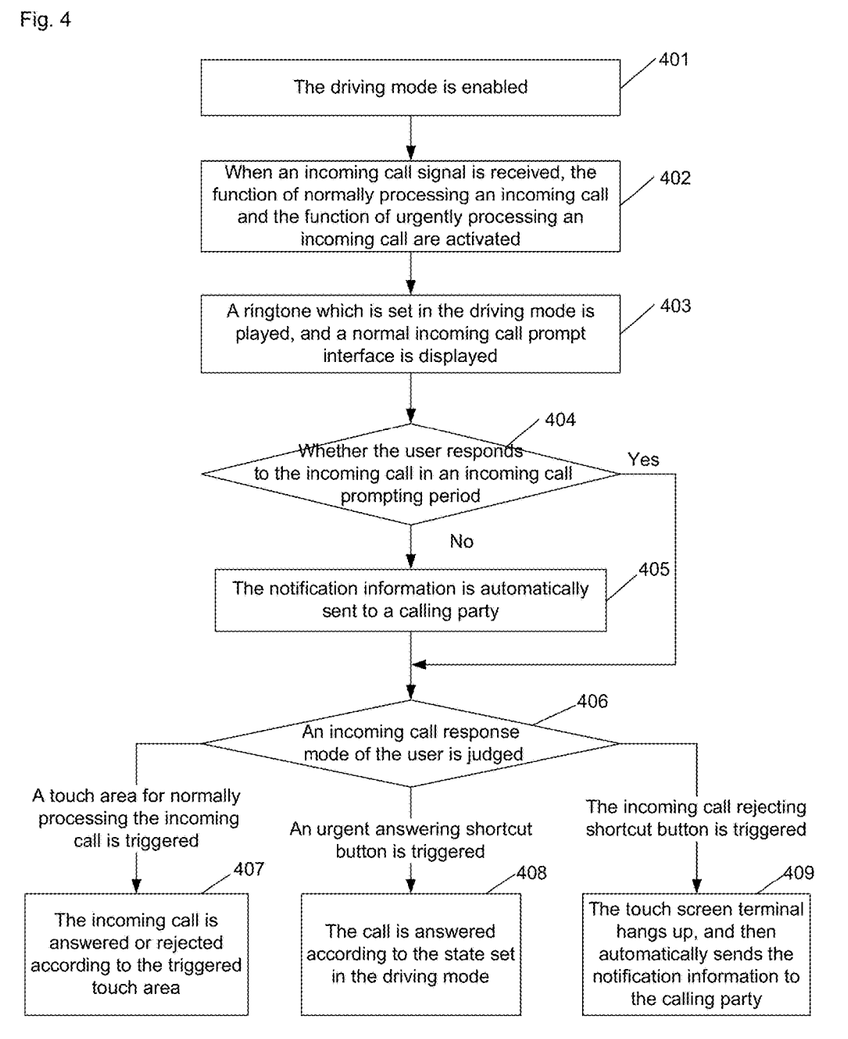
FIG. 4 is a flowchart of processing an incoming call in the driving mode according to an embodiment of the disclosure.

In the driving mode, an embodiment of the disclosure optimizes a mode of processing an incoming call; as shown in FIG. 4, the processing steps are as follows.

Step 401 is that the driving mode is enabled.

Here, the driving mode can be set according to FIG. 3.

Step 402 is that when an incoming call signal is received, the function of normally processing an incoming call and the function of urgently processing an incoming call are activated.

Figure 5:
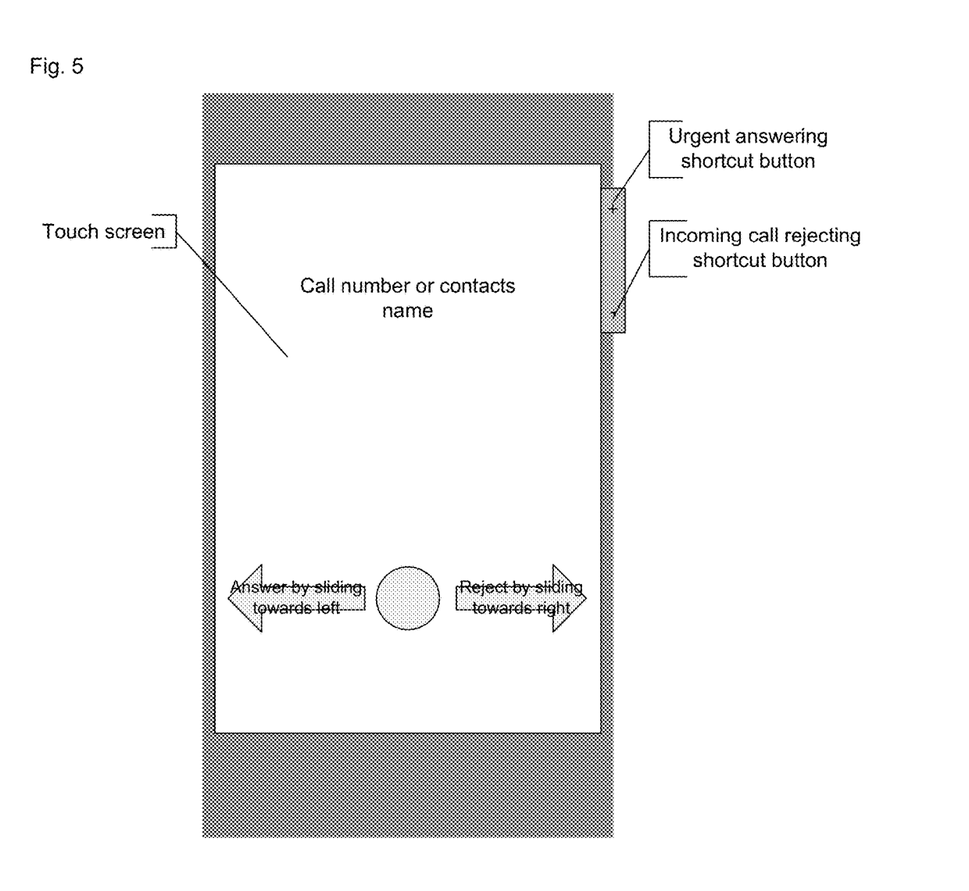
FIG. 5 is a diagram of a touch screen terminal, an urgent answering shortcut button and an incoming call rejecting shortcut button according to an embodiment of the disclosure.
Figure 6:
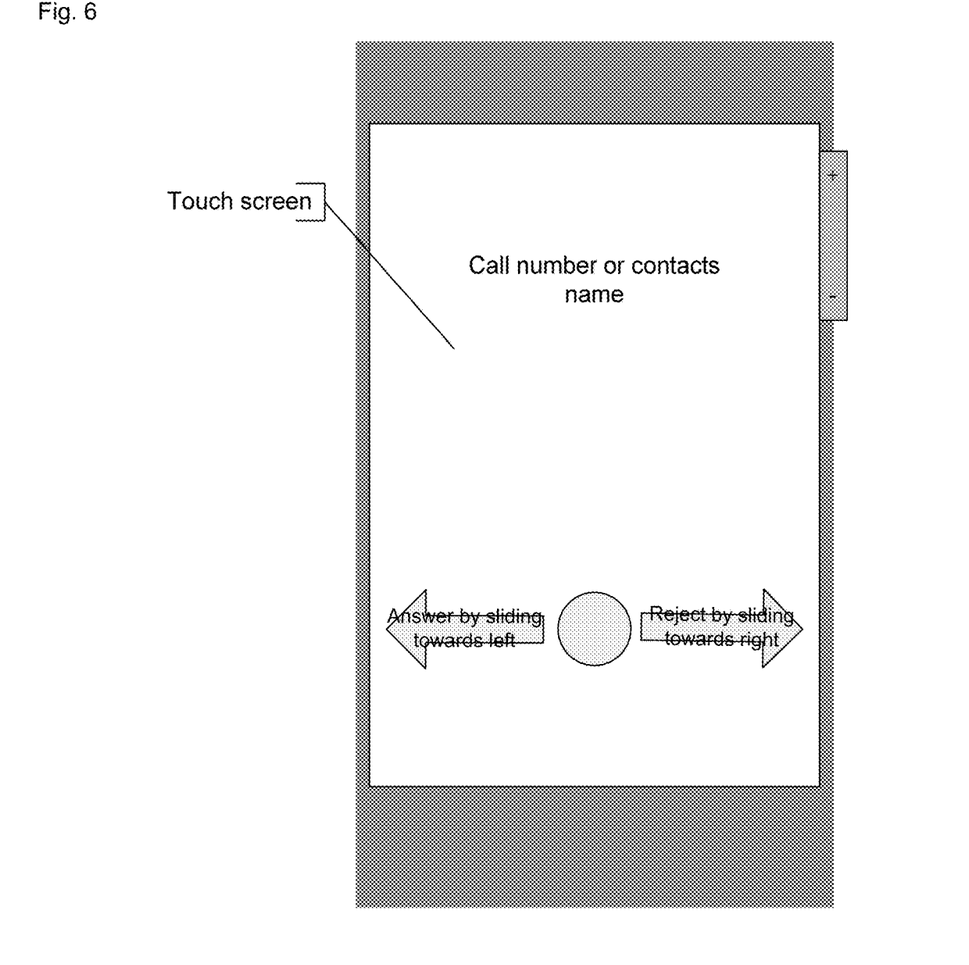
FIG. 6 is a diagram of a normal call prompt interface when there is a normal incoming call according to an existing design.

That is, the touch screen terminal activates the normal incoming call prompt interface, and activates the predetermined urgent answering shortcut button and incoming call rejecting shortcut button. FIG. 5 is a diagram of the touch screen terminal, the urgent answering shortcut button and the incoming call rejecting shortcut button. The normal incoming call prompt interface of the touch screen terminal includes a touch area of the incoming call number or contact name, a touch area of answering the call by sliding towards the left, and a touch area of rejecting the call by sliding towards the right; the normal incoming call prompt interface is the same as that provided in the prior art, as shown in FIG. 6. The urgent answering shortcut button and the incoming call rejecting shortcut button can be set on the touch screen terminal separately, or can also be other existing physical buttons; in this embodiment, the urgent answering shortcut button is an existing upper side button of the touch screen terminal, and the incoming call rejecting shortcut button is an existing lower side button of the touch screen terminal.

In the driving mode, the normal incoming call prompt interface can be used in the condition that although the driving mode is enabled, the user is not in a driving state when receiving an incoming call, or can also be used in the condition that there is a person in a passenger seat who can help answering the incoming call when the user is driving.

Furthermore, after the function of normally processing an incoming call and the function of urgently processing an incoming call are activated, the timer is started to time, so as to judge whether the user responds within the timing time of the timer.

Step 403 is that the ringtone which is set in the driving mode is played, and the normal incoming call prompt interface is displayed.

Here, the normal incoming call prompt interface is shown in FIG. 5.

Step 404 is that it is judged whether the user responds to the incoming call in an incoming call prompting period (the timing time); if the user responds to the incoming call, then Step 406 is executed, or else, Step 405 is executed.

Step 405 is that the notification information is automatically sent to the calling party.

If the user does not stop ringing or process the incoming call, that is, the user does not respond in the incoming call prompting period, the touch screen terminal automatically sends notification information to the calling party, for example, responding to and prompt the calling party with a short message that: "the user is driving, it is not convenient to answer your call".

Step 406 is that an incoming call response mode of the user is judged; if the user makes an incoming call response by triggering the touch area for normally processing the incoming call, Step 407 is executed; if the user makes the incoming call response by triggering the urgent answering shortcut button, Step 408 is executed; if the user makes the incoming call response by triggering the incoming call rejecting shortcut button, Step 409 is executed.

Step 407 is that the incoming call is answered or rejected according to the triggered touch area.

If the user makes the incoming call response by triggering the touch area for normally processing the incoming call, that is, if the touch screen terminal detects that the user responds to the incoming call by pressing the touch screen, the incoming call is answered or rejected according to the triggered touch area, namely the incoming call is processed in the existing way.

Step 408 is that the call is answered according to the state which is set in the driving mode.

If the user makes the incoming call response by triggering the urgent answering shortcut button, that is, if the touch screen terminal detects that the user presses the urgent answering shortcut button, the touch screen terminal answers the call according to the state set in the driving mode, and then hangs up at the end of call.

Step 409 is that the touch screen terminal hangs up, and then automatically sends the notification information to the calling party.

If the user makes the incoming call response by triggering the incoming call rejecting shortcut button, that is, if the touch screen terminal detects that the user presses the incoming call rejecting shortcut button, then the touch screen terminal hangs up, and then automatically sends the notification information to the calling party.

For example, the touch screen terminal responds to and prompts the calling party with the short message that: "the user is driving, it is not convenient to answer your call".

To sum up, the disclosure makes it more convenient for a touch screen terminal holder who receives an incoming call when driving to take an answering or rejecting action and answer urgently, thereby improving the security of the driver processing the incoming call when driving.

The above are only the preferred embodiments of the disclosure and not intended to limit the scope of the claims of the disclosure. Any modifications, equivalent replacements, improvements and the like within the spirit and principle of the disclosure shall fall within the scope of the claims of the disclosure.

INDUSTRIAL APPLICABILITY

In the disclosure, when a touch screen terminal receives an incoming call, a function of normally processing an incoming call and a function of urgently processing an incoming call are activated; an incoming call response which is made by a user through the function of normally processing an incoming call or the function of urgently processing an incoming call is detected; and the incoming call is processed correspondingly according to the result of the detected incoming call response; in this way, it is more convenient for the touch screen terminal holder who receives the incoming call when driving to take the answering or rejecting action and answer urgently, thereby improving the security of the driver processing the incoming call when driving.

The invention claimed is:

1. A method for processing an incoming call when driving, comprising:
  when a touch screen terminal receives an incoming call, activating a function of normally processing an incoming call and a function of urgently processing an incoming call;
  detecting an incoming call response which is made by a user through the function of normally processing an incoming call or the function of urgently processing an incoming call; and
  processing the incoming call correspondingly according to a result of the detected incoming call response,
  wherein the touch screen terminal activates the function of urgently processing an incoming call by activating physical buttons on it, wherein the physical buttons comprise an urgent answering shortcut button for answering the incoming call and an incoming call rejecting shortcut button for rejecting the incoming call,
  wherein after the touch screen terminal activates the function of normally processing an incoming call and the function of urgently processing an incoming call, the method further comprises:
  starting a timer; and
  detecting the incoming call response of the user within the timing time of the timer,
  when the incoming call response which is made by the user by triggering the urgent answering shortcut button is detected within the timing time, answering the incoming call, or, when the incoming call response which is made by the user by triggering the incoming call rejecting shortcut button is detected within the timing time, or when the incoming call response which is made by the user is not detected within the timing time, rejecting the incoming call, and sending preset notification information to a calling party; and
  when the incoming call response which is made by the user by triggering a touch area for normally processing the incoming call is detected within the timing time, answering or rejecting the incoming call according to the triggered touch area.

2. A device for processing an incoming call when driving, comprising:
  an activating module, which is configured to, when a touch screen terminal receives an incoming call, activate a function of normally processing an incoming call and a function of urgently processing an incoming call;
  a detecting module, which is configured to detect an incoming call response which is made by a user through the function of normally processing an incoming call or the function of urgently processing an incoming call; and
  an incoming call processing module, which is configured to process the incoming call correspondingly according to a result of the detected incoming call response,
  wherein the activating module is configured to activate the function of urgently processing an incoming call by activating physical buttons on the touch screen terminal, wherein the physical buttons comprise an urgent answering shortcut button for answering the incoming call and an incoming call rejecting shortcut button for rejecting the incoming call,
  wherein the detecting module comprises:
  a timer sub-module, which is configured to, after the touch screen terminal activates the function of normally processing an incoming call and the function of urgently processing an incoming call, start a timer; and
  a detecting sub-module, which is configured to detect the incoming call response of the user within the timing time of the timer,
  wherein the incoming call processing module comprises:
  an incoming call urgent processing sub-module, which is configured to, when the incoming call response which is made by the user by triggering the urgent answering shortcut button is detected within the timing time, answer the incoming call, or, when the incoming call response which is made by the user by triggering the incoming call rejecting shortcut button is detected within the timing time, or when the incoming call response which is made by the user is not detected within the timing time, reject the incoming call, and send preset notification information to a calling party; and
  an incoming call normal processing sub-module, which is configured to, when the incoming call response which is made by the user by triggering a touch area for normally processing the incoming call is detected within the timing time, answer or reject the incoming call according to the triggered touch area.

3. A touch screen terminal for processing an incoming call when driving, comprising a device for processing an incoming call when driving, wherein the device comprises:

an activating module, which is configured to, when a touch screen terminal receives an incoming call, activate a function of normally processing an incoming call and a function of urgently processing an incoming call;

a detecting module, which is configured to detect an incoming call response which is made by a user through the function of normally processing an incoming call or the function of urgently processing an incoming call; and an incoming call processing module, which is configured to process the incoming call correspondingly according to a result of the detected incoming call response, wherein the activating module is configured to activate the function of urgently processing an incoming call by activating physical buttons on the touch screen terminal, wherein the physical buttons comprise an urgent answering shortcut button for answering the incoming call and an incoming call rejecting shortcut button for rejecting the incoming call, wherein the detecting module comprises:

a timer sub-module, which is configured to, after the touch screen terminal activates the function of normally processing an incoming call and the function of urgently processing an incoming call, start a timer; and a detecting sub-module, which is configured to detect the incoming call response of the user within the timing time of the timer, wherein the incoming call processing module comprises:

an incoming call urgent processing sub-module, which is configured to, when the incoming call response which is made by the user by triggering the urgent answering shortcut button is detected within the timing time, answer the incoming call, or, when the incoming call response which is made by the user by triggering the incoming call rejecting shortcut button is detected within the timing time, or when the incoming call response which is made by the user is not detected within the timing time, reject the incoming call, and send preset notification information to a calling party; and an incoming call normal processing sub-module, which is configured to, when the incoming call response which is made by the user by triggering a touch area for normally processing the incoming call is detected within the timing time, answer or reject the incoming call according to the triggered touch area.

* * * * *